(12) United States Patent
Song et al.

(10) Patent No.: US 11,446,824 B2
(45) Date of Patent: Sep. 20, 2022

(54) PALLETIZING CONTROL DEVICE, SYSTEM AND METHOD AND STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Guoku Song, Beijing (CN); Zongjing Yu, Beijing (CN)

(73) Assignee: BEIJING JINGDONG QIANSHI TECHNOLOGY CO., LTD., Beijing (CN)

(*) Notice: Subject to any disclaimer, the term of this patent is extended or adjusted under 35 U.S.C. 154(b) by 288 days.

(21) Appl. No.: 16/642,679

(22) PCT Filed: Jul. 17, 2018

(86) PCT No.: PCT/CN2018/095959
§ 371 (c)(1),
(2) Date: Feb. 27, 2020

(87) PCT Pub. No.: WO2019/056840
PCT Pub. Date: Mar. 28, 2019

(65) Prior Publication Data
US 2020/0206932 A1 Jul. 2, 2020

(30) Foreign Application Priority Data
Sep. 21, 2017 (CN) .......................... 201710856002.4

(51) Int. Cl.
*B25J 9/16* (2006.01)
*B65G 47/90* (2006.01)
*B65G 57/24* (2006.01)

(52) U.S. Cl.
CPC .......... *B25J 9/1687* (2013.01); *B65G 47/901* (2013.01); *B65G 57/24* (2013.01)

(58) Field of Classification Search
CPC ...... B25J 9/1687; B65G 47/901; B65G 57/24; B65G 47/084; G05B 2219/40006; G05D 3/12
See application file for complete search history.

(56) References Cited

U.S. PATENT DOCUMENTS

| 4,456,418 A | * | 6/1984 | Harter | ................... | B23Q 7/1442 29/33 P |
| 2013/0115040 A1 | * | 5/2013 | Masutomi | .............. | B25J 9/1682 414/801 |

(Continued)

FOREIGN PATENT DOCUMENTS

| CN | 102773858 A | 11/2012 |
| CN | 102774661 A | 11/2012 |

(Continued)

OTHER PUBLICATIONS

International Search Report dated Oct. 15, 2018 in PCT/CN2018/095959, 11 pages.

(Continued)

*Primary Examiner* — Abby Y Lin
*Assistant Examiner* — Danielle Marie Jackson
(74) *Attorney, Agent, or Firm* — Oblon, McClelland, Maier & Neustadt, L.L.P.

(57) ABSTRACT

The present disclosure relates to a palletizing control device, system, method and storage medium, and relates to the technical field of logistics. A palletizing control device includes: a prestage position generation module configured to generate a prestage position of an article to be palletized by respectively shifting a placement position of the article to be palletized along a horizontal palletizing direction by a horizontal offset corresponding to the article to be palletized and along a vertical palletizing direction by a vertical offset corresponding to the article to be palletized; and a path generation module configured to generate movement path information representing a straight path from the prestage position of the article to be palletized to the placement position of the article to be palletized.

19 Claims, 9 Drawing Sheets

(56) References Cited

U.S. PATENT DOCUMENTS

| | | | |
|---|---|---|---|
| 2014/0294553 A1* | 10/2014 | Petrovic | B65G 61/00 414/794.6 |
| 2015/0284192 A1 | 10/2015 | Hirschek et al. | |
| 2016/0184992 A1 | 6/2016 | Naderer et al. | |
| 2017/0233201 A1* | 8/2017 | Benedetti | B65G 61/00 414/791.4 |
| 2021/0221614 A1* | 7/2021 | Kollmuss | B25J 15/00 |

FOREIGN PATENT DOCUMENTS

| | | |
|---|---|---|
| CN | 104460628 A | 3/2015 |
| CN | 104528389 A | 4/2015 |
| CN | 104570735 A | 4/2015 |
| CN | 105904462 A | 8/2016 |
| CN | 106403950 A | 2/2017 |
| CN | 107479581 A | 12/2017 |
| JP | 9-290335 A | 11/1997 |
| JP | 4748300 B2 | 8/2011 |
| JP | 5926574 B2 | 5/2016 |

OTHER PUBLICATIONS

Combined Chinese Office Action and Search Report dated Apr. 18, 2019 in Chinese Patent Application No. 201710856002.4 (with English translation), 21 pages.

Combined Chinese Office Action and Search Report dated Oct. 21, 2019 in Chinese Patent Application No. 201710856002.4 (with English translation), 26 pages.

Peng-Fei, X., et al., "Research on Trajectory Planning of New Industrial Palletizing Robot", Modular Machine Tool & Automatic Manufacturing Technique, No. 5, May 2012, pp. 70-77 (wth English abstract).

office Action dated Aug. 18, 2021 in corresponding India Patent Application No. 202037008697 (with English Translation), 5 pages.

\* cited by examiner

FIG. 1

| Article 1 | Article 2 | Article 3 |
|-----------|-----------|-----------|
| Article 4 | Article 5 | Article 6 |
| Article 7 | Article 8 | Article 9 |

PALLETIZING CONTROL DEVICE, SYSTEM AND METHOD AND STORAGE MEDIUM

CROSS-REFERENCE TO RELATED APPLICATIONS

The present application is based on the application with a CN application number of 201710856002.4 and the filing date being Sep. 21, 2017, and claims its priority. The disclosure of this CN application as a whole is incorporated into the present application herein by reference.

TECHNICAL FIELD

The present disclosure relates to the technical field of logistics, and in particular, to a palletizing control device, system, method and storage medium.

BACKGROUND

Palletizing refers to the operation of stacking products having substantially uniform shape according to certain requirements. Using a robot as a palletizing execution tool can greatly improve the palletizing flexibility, and save the manpower resource.

SUMMARY

The inventors have found through analysis that in the related art, for each article to be palletized, an engineer is required to determine the spatial position of each article in a manner of teaching in advance, that is, the engineer determines the trajectory and the operating point of the robot in the palletizing process in advance through manual operation so as to prevent collision between the articles. The one-by-one teaching method used in the related technology brings a large workload and is difficult to realize dynamic adjustment, thus the palletizing efficiency will be reduced.

One technical problem that is to be solved by the embodiments of the present disclosure is: how to improve the palletizing efficiency.

According to a first aspect of some embodiments of the present disclosure, there is provided a palletizing control device, comprising: a prestage position generation module configured to generate a prestage position of an article to be palletized by respectively shifting a placement position of the article to be palletized along a horizontal palletizing direction by a horizontal offset corresponding to the article to be palletized and along a vertical palletizing direction by a vertical offset corresponding to the article to be palletized; and a path generation module configured to generate movement path information representing a straight path from the prestage position of the article to be palletized to the placement position of the article to be palletized.

In some embodiments, the control device comprises: a placement position determination module configured to determine an adjacent placement position according to a determined placement position and a size of an article to be palletized placed on the determined placement position in a layer of a palletizing place in sequence until an edge of the article to be palletized placed on the adjacent placement position exceeds an edge of a pallet.

In some embodiments, the horizontal offset comprises a first horizontal offset representing an offset in a lateral palletizing direction in a horizontal plane and a second horizontal offset representing an offset in a longitudinal palletizing direction in the horizontal plane.

In some embodiments, the first horizontal offset is a product of a length of the article to be palletized in the lateral palletizing direction and a preset lateral ratio.

In some embodiments, the second horizontal offset is a product of a length of the article to be palletized in the longitudinal palletizing direction and a preset longitudinal ratio.

In some embodiments, the vertical offset is negatively related to a vertical distance from the placement position to a horizontal plane where a pallet for palletizing the article to be palletized locates.

In some embodiments, the path generation module is further configured to generate movement path information for a plurality of articles to be palletized, comprising information on a movement path from a starting position to a prestage position of an article to be palletized or information on a movement path from a placement position of an article to be palletized to a starting position of another article to be palletized.

According to a first aspect of some embodiments of the present disclosure, there is provided a palletizing control system, comprising: any one of the above palletizing control devices; and a robot controller configured to instruct a robot to palletize articles according to the movement path information generated by the palletizing control device.

According to a second aspect of some embodiments of the present disclosure, there is provided a palletizing control method, comprising: generating a prestage position of an article to be palletized by respectively shifting a placement position of the article to be palletized along a horizontal palletizing direction by a horizontal offset corresponding to the article to be palletized and along a vertical palletizing direction by a vertical offset corresponding to the article to be palletized; and generating movement path information representing a straight path from the prestage position of the article to be palletized to the placement position of the article to be palletized.

In some embodiments, the palletizing control method comprises: determining an adjacent placement position according to a determined placement position and a size of an article to be palletized placed on the determined placement position in a layer of a palletizing place in sequence until an edge of the article to be palletized placed on the adjacent placement position exceeds an edge of a pallet.

In some embodiments, the horizontal offset comprises a first horizontal offset representing an offset in a lateral palletizing direction in a horizontal plane and a second horizontal offset representing an offset in a longitudinal palletizing direction in the horizontal plane.

In some embodiments, the first horizontal offset is a product of a length of the article to be palletized in the lateral palletizing direction and a preset lateral ratio.

In some embodiments, the second horizontal offset is a product of a length of the article to be palletized in the longitudinal palletizing direction and a preset longitudinal ratio.

In some embodiments, the vertical offset is negatively related to a vertical distance from the placement position to a horizontal plane where a pallet for palletizing the article to be palletized locates.

In some embodiments, the generating movement path information representing a straight path from the prestage position of the article to be palletized to the placement position of the article to be palletized comprises: generating movement path information for a plurality of articles to be palletized, comprising information on a movement path from a starting position to a prestage position of an article to be palletized or information on a movement path from a placement position of an article to be palletized to a starting position of another article to be palletized.

According to a third aspect of some embodiments of the present disclosure, there is provided a palletizing control device, comprising: a memory; and a processor coupled to the memory, the processor configured to execute the palletizing control method for performing instructions comprising: generating a prestage position of an article to be palletized by respectively shifting a placement position of the article to be palletized along a horizontal palletizing direction by a horizontal offset corresponding to the article to be palletized and along a vertical palletizing direction by a vertical offset corresponding to the article to be palletized; and generating movement path information representing a straight path from the prestage position of the article to be palletized to the placement position of the article to be palletized.

In some embodiments, the instructions comprise: determining an adjacent placement position according to a determined placement position and a size of an article to be palletized placed on the determined placement position in a layer of a palletizing place in sequence until an edge of the article to be palletized placed on the adjacent placement position exceeds an edge of a pallet.

In some embodiments, the horizontal offset comprises a first horizontal offset representing an offset in a lateral palletizing direction in a horizontal plane and a second horizontal offset representing an offset in a longitudinal palletizing direction in the horizontal plane.

In some embodiments, the first horizontal offset is a product of a length of the article to be palletized in the lateral palletizing direction and a preset lateral ratio; or the second horizontal offset is a product of a length of the article to be palletized in the longitudinal palletizing direction and a preset longitudinal ratio.

In some embodiments, the vertical offset is negatively related to a vertical distance from the placement position to a horizontal plane where a pallet for palletizing the article to be palletized locates.

In some embodiments, the generating movement path information representing a straight path from the prestage position of the article to be palletized to the placement position of the article to be palletized comprises: generating movement path information for a plurality of articles to be palletized, comprising information on a movement path from a starting position to a prestage position of an article to be palletized or information on a movement path from a placement position of an article to be palletized to a starting position of another article to be palletized.

According to a fourth aspect of some embodiments of the present disclosure, there is provided a non-transitory computer-readable storage medium having stored thereon a computer program, wherein the program, when executed by a processor, implements the palletizing control methods for performing instructions comprising: generating a prestage position of an article to be palletized by respectively shifting a placement position of the article to be palletized along a horizontal palletizing direction by a horizontal offset corresponding to the article to be palletized and along a vertical palletizing direction by a vertical offset corresponding to the article to be palletized; and generating movement path information representing a straight path from the prestage position of the article to be palletized to the placement position of the article to be palletized.

In some embodiments, the instructions comprise: determining an adjacent placement position according to a determined placement position and a size of an article to be palletized placed on the determined placement position in a layer of a palletizing place in sequence until an edge of the article to be palletized placed on the adjacent placement position exceeds an edge of a pallet.

In some embodiments, the horizontal offset comprises a first horizontal offset representing an offset in a lateral palletizing direction in a horizontal plane and a second horizontal offset representing an offset in a longitudinal palletizing direction in the horizontal plane.

In some embodiments, the first horizontal offset is a product of a length of the article to be palletized in the lateral palletizing direction and a preset lateral ratio; or the second horizontal offset is a product of a length of the article to be palletized in the longitudinal palletizing direction and a preset longitudinal ratio.

In some embodiments, the vertical offset is negatively related to a vertical distance from the placement position to a horizontal plane where a pallet for palletizing the article to be palletized locates.

In some embodiments, the generating movement path information representing a straight path from the prestage position of the article to be palletized to the placement position of the article to be palletized comprises: generating movement path information for a plurality of articles to be palletized, comprising information on a movement path from a starting position to a prestage position of an article to be palletized or information on a movement path from a placement position of an article to be palletized to a starting position of another article to be palletized.

Some embodiments in the above disclosure have the following advantages or benefits: the present disclosure obtains a prestage position of an article to be palletized by shifting a placement position of the article to be palletized, makes the article to be palletized pass through the prestage position when moving, and move to the placement position from the prestage position along a straight line, so that automatic palletizing can be realized, and collision between articles can be avoided during the palletizing process, which improves palletizing efficiency and safety.

Other features and advantages of the present disclosure will become clear through detailed descriptions of the illustrative embodiments of the present disclosure with reference to the following accompanying drawings.

BRIEF DESCRIPTION OF THE DRAWINGS

In order to more clearly illustrate the embodiments or technical solutions in existing technologies of the present disclosure, a brief introduction will be given below for the drawings required to be used in the description of the embodiments or technical solutions in existing technologies. It is obvious that, the drawings illustrated as follows are merely some of the embodiments of the present disclosure. For an ordinary skilled in the art, he or she may also acquire other drawings according to such drawings without paying inventive efforts.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure instead of all of them. The following descriptions on at least one illustrative embodiment are actually illustrative, but shall not set any limitation on the present disclosure and its application or utilization. All other embodiments that are obtainable to those skilled in the art based on the embodiments of the present disclosure without any creative effort are included in the protection scope of the present disclosure.

Unless otherwise illustrated, respective arrangements, mathematic expressions and values of the components and steps illustrated in these embodiments do not limit the scope of the present disclosure.

Meanwhile, it shall be understood that in order to facilitate description, the respective parts shown in the drawings are not drawn in sizes according to actual proportional relations.

Techniques, methods and devices that have already been known to ordinary technicians in the art may not be discussed here in detail, but under suitable circumstances, the techniques, methods and devices shall be deemed as parts of the granted description.

In the embodiments shown and discussed here, any specific value shall be interpreted as only illustrative, instead of limitative. Hence, other embodiments of the illustrative embodiments may have different values.

It shall be noted that similar marks and letters represent similar items in the following figures, so once a certain item is defined in one figure, no further discussion on it is required in the following figures.

The inventors have found through analysis that in the related art, for each article to be palletized, an engineer is required to determine the spatial position of each article in a manner of teaching in advance, that is, the engineer determines the trajectory and the operating point of the robot in the palletizing process in advance through manual operation so as to prevent collision between the articles. The one-by-one teaching method used in the related technology brings a large workload and is difficult to realize dynamic adjustment, thus the palletizing efficiency will be reduced.

One technical problem that is to be solved by the embodiments of the present disclosure is: how to improve the palletizing efficiency.

Figure 1:
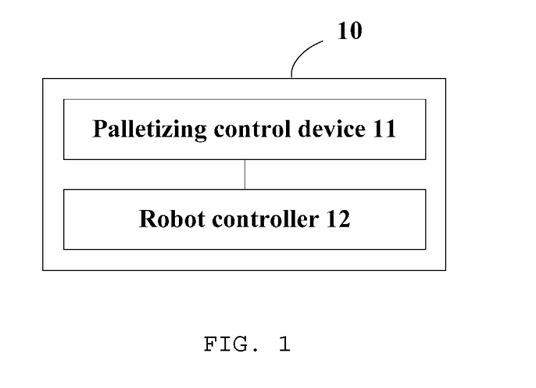
FIG. 1 shows a structural schematic diagram of a palletizing control system according to some embodiments of the present disclosure.

FIG. 1 shows a structural schematic diagram of a palletizing control system according to some embodiments of the present disclosure. As shown in FIG. 1, palletizing control system 10 of this embodiment includes a palletizing control device 11 and a robot controller 12. The articles to be palletized in this embodiment may be, for example, containers in a warehouse or the like.

The palletizing control device 11 is used for generating movement path information and transmitting the movement path information to the robot controller 12. The movement path information is used for indicating movement routes of actuators such as an end effector, a manipulator or the like of a robot, and at least comprises a movement route after the actuators of the robot grab the articles in the palletizing process.

The palletizing control device 11 may be a module or a device in a scheduling platform or a general control platform, for example, it may be a computer or a controller carrying an industrial control programming tool (e.g., Codesys).

The robot controller 12 is located in the robot or is coupled to one or more components of the robot. The robot may be, for example, a 6-degrees-of-freedom or 4-degrees-of-freedom tandem joint robot. The robot controller 12 receives information transmitted from the palletizing control device 11, and controls each component of the robot to operate according to the received information. In some embodiments of the present disclosure, the robot controller 12 instructs the actuator to move according to the movement path information transmitted by the palletizing control device 11.

In some embodiments, the palletizing control system 10 may further include an end effector. The end effector is a device for gripping and palletizing articles, such as a robotic arm, a robotic gripper, or the like. For example, The end effector may be a device including a gripper jaw and a suction cup.

In some embodiments of the present disclosure, positions are employed to represent placement or passing locations of articles. In some embodiments, the position to which each article corresponds may be a center point of the upper surface of the article. Since the flange center or Tool Center Point (TCP Point) of the end effector usually corresponds to the center point of the upper surface of the article during grasping, the flange center of the end effector can be made to have the same coordinates with the point to which the article corresponds. Of course, other points on the article may also be used by those skilled in the art to indicate the location of the article, as desired.

The above embodiments exemplarily show an application scenario of the present disclosure and an interaction process between respective devices in the scenario. The following describes a palletizing control method of some embodiments of the present disclosure, which may be performed by a palletizing control device.

Figure 2:
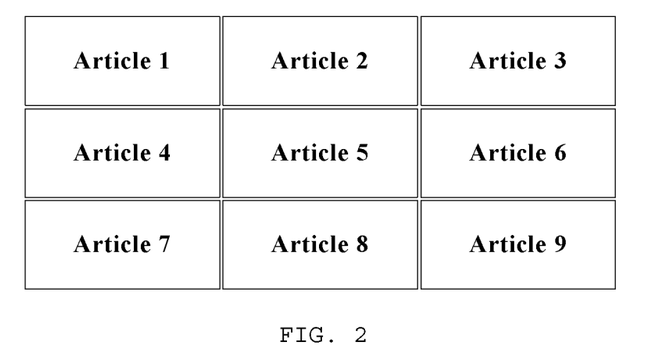
FIG. 2 shows a schematic diagram of an article palletizing scenario according to some embodiments of the present disclosure.

FIG. 2 exemplarily shows an article palletizing scenario with a view angle looking down on a pallet, according to some embodiments of the present disclosure. For convenience of description, the articles to be palletized in FIG. 2 are all articles of the same specification.

As shown in FIG. 2, each pallet can hold 9 articles, depending on the size of the pallet and the articles. Palletizing is required to be performed according to a certain sequence. For example, the palletizing can be performed in a layer in the order of 1 to 9 in FIG. 2. Assuming that the direction from the article 7 to the article 4 in FIG. 2 is the forward direction of the pallet and the direction from the article 7 to the article 8 is the rightward direction of the pallet, the articles are palletized in the horizontal direction in the order from left to right and from front to back. After one layer of articles is palletized, the second layer of goods is sequentially palletized according to a certain sequence, namely, the articles are palletized from bottom to top in the vertical direction. Of course, the articles in the pallet can be articles with different sizes according to requirements, as long as they are stacked according to a certain sequence.

Based on the above application scenario and similar application scenarios, the present disclosure provides a palletizing control method. In the following embodiments, reference may be made to FIG. 2 for the left-right, front-back, and top-bottom orientation relationship among the articles, which will not be described in detail in the following embodiments. It should be clear to those skilled in the art that FIG. 2 is only an exemplary palletizing scenario and does not limit the present disclosure in any way.

Figure 3:
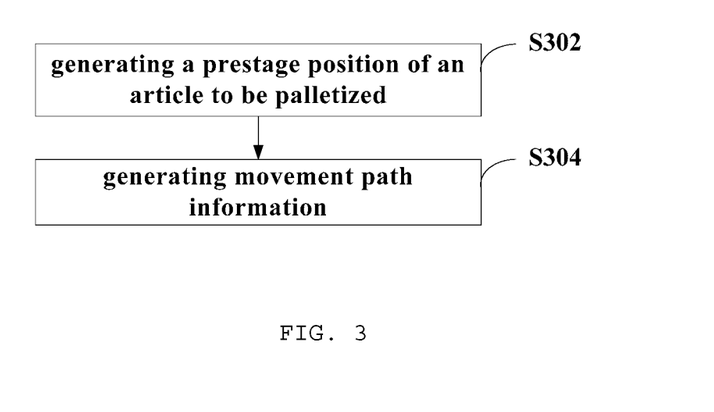
FIG. 3 shows a schematic flow diagram of a palletizing control method according to some embodiments of the present disclosure.

FIG. 3 shows a schematic flow diagram of a palletizing control method according to some embodiments of the present disclosure. As shown in FIG. 3, the palletizing control method of this embodiment includes steps S302 to S304.

In step S302, a prestage position of an article to be palletized is generated by respectively shifting a placement position of the article to be palletized along a horizontal palletizing direction by a horizontal offset corresponding to the article to be palletized and along a vertical palletizing direction by a vertical offset corresponding to the article to be palletized. The placement position of the article to be palletized is the placement position of the article to be palletized on the pallet, which is calculated or obtained in advance. For example, a spatial coordinate system may be established to represent the specific position of the placement position in coordinates.

A horizontal offset and a vertical offset represent distances between the prestage position and the placement position in the horizontal direction and the vertical direction, respectively. Each direction in the horizontal plane may be considered a horizontal direction, such as a lateral palletization direction and a longitudinal palletization direction of the article in the horizontal plane, and so on.

The horizontal offset may be a single value, i.e. representing a linear distance between the prestage position and the placement position in the horizontal direction. The horizontal offset may also be a set of values constituted by the first horizontal offset and the second horizontal offset, that is, a linear distance between the prestage position and the placement position in the horizontal direction is decomposed into distances in two different directions or dimensions for calculation and setting.

The palletizing direction is a direction indicated by the palletizing order, and may be represented by directions of three coordinate axes perpendicular to each other, for example. Referring to the palletizing sequence in the embodiment of FIG. 2, for example, the palletizing directions are rightward, backward, and upward referring to the pallet. The placement position may be shifted upward and right backward to obtain a prestage position.

When offset calculation is performed, the placement position and the prestage position may be represented as coordinates in a three-dimensional space, and the offset direction may be corresponding to a direction corresponding to a coordinate axis or a direction of a specific vector in the three-dimensional space, so as to facilitate the calculation.

In addition, a starting position of the article to be palletized can be obtained. A starting position of the article to be palletized is the position of the article when the robot grabs the article. The starting position of each article to be palletized may be the same, for example, when an article is transported on a conveyor belt, the end effector of the robot grabs the article each time at a same position on the conveyor belt. According to the requirement, each article to be palletized can be set to have different starting positions, which is not described here in detail.

In step S304, movement path information representing a straight path from the prestage position of the article to be palletized to the placement position of the article to be palletized is generated. The movement path information includes at least a movement trajectory of the article to be palletized, for example, instructing the end effector to grasp the article to be palletized to move from coordinate A to coordinate B, and so on. The movement path information includes a straight path from the prestage position of the article to be palletized to the placement position of the article to be palletized.

Furthermore, the movement path information may also include other movement information of the end effector itself and related performance information at various locations, including, for example, information instructing the end effector to move from coordinate O to coordinate A in an unloaded condition, to grasp an article at coordinate A, and to move linearly from coordinate A to coordinate B, moving speed information, execution time information, or the like.

In some embodiments, the movement path information may instruct the robot to continuously palletize a plurality of articles. In this case, the movement path information may include: a first sub-path from a starting position of an article A to be palletized to a prestage position of the article A to be palletized, a second sub-path from the prestage position of the article A to be palletized to a placement position of the article A to be palletized, and a third sub-path from the placement position of the article A to be palletized to a starting position of an article B to be palletized. That is, after placement of an article, the robot automatically returns to a starting position of a next article to palletize the next article.

These three different types of sub-paths may be arranged to have different speeds of movement, as desired. In some embodiments, the movement speeds corresponding to the third sub-path, the first sub-path and the second sub-path may be set to sequentially decrease, that is, the moving speed is fastest when unloaded, so as to improve the moving efficiency, and the speed is the slowest when grabbing an article to drop it, so as to reduce the impact of the landing process on the goods in the article.

Since the prestage position is in the palletizing direction with respect to the placement position, there are no placed articles around the current prestage position, nor are there placed articles on the path from the prestage position to the placement position. The positional relationship between the placement position and the prestage position of the article to be palletized can be referred to the schematic diagrams shown in FIGS. 4A and 4B, in which FIG. 4A is a top view and FIG. 4B is a rear view.

Figure 4A:
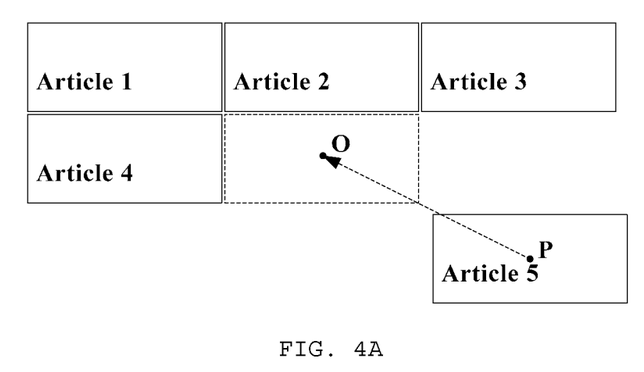
FIG. 4A and FIG. 4B show schematic diagrams of a positional relationship between a placement position and a prestage position of an article to be palletized according to some embodiments of the present disclosure.
Figure 4B:
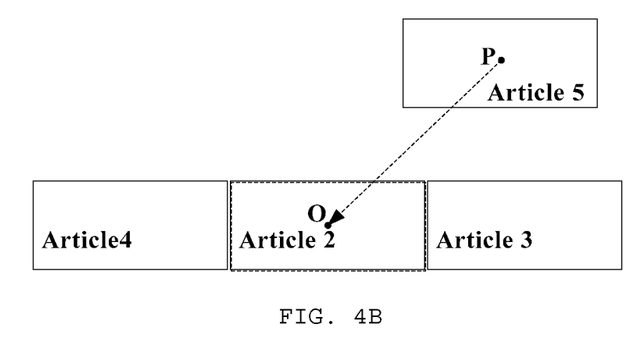

In FIGS. 4A and 4B, the palletized articles are articles 1 to 4 indicated by solid line frames, and the article to be palletized is an article 5 indicated by a solid line frame. The placement position of the article 5 is a point O, and the prestage position of the article 5 is a point P. The dashed arrow indicates the movement direction of the article 5, and the dashed line frame indicates the placement position of the article 5 after movement. As shown in FIGS. 4A and 4B, the article 5 does not collide with other articles when moving from point P to point O.

The method of the above embodiments determines a prestage position of the article to be palletized by shifting a placement position of the article to be palletized, makes the article to be palletized pass through the prestage position when moving and move to the placement position from the prestage position along a straight line, so that automatic palletizing can be realized, and collision between articles can be avoided during the palletizing process, thus palletizing efficiency and safety are improved.

There are many ways to set the horizontal offset and the vertical offset, and several setting methods are described below by way of example.

Firstly, several setting methods of the horizontal offset are described.

The horizontal offset may include a first horizontal offset and a second horizontal offset. In some embodiments, the first horizontal offset represents an offset in a lateral palletizing direction in a horizontal plane and the second horizontal offset represents an offset in a longitudinal palletizing direction in the horizontal plane. Other setting methods can be adopted by those skilled in the art as required, which are not described in detail herein. The following describes different setting methods of the first horizontal offset and the second horizontal offset with reference to FIGS. 5A to 5D.

In FIGS. 5A to 5D, the article to be palletized is an article 5 indicated by a solid line frame, other solid line frames indicate the palletized articles. The placement position of the article 5 is a point O, and the prestage position of the article 5 is a point P. The dashed arrow indicates the movement direction of the article 5, and the dashed line frame indicates the placement position of the article 5 after movement. In the embodiments corresponding to FIGS. 5A to 5D, the first horizontal offset represents an offset in the lateral palletizing direction in a horizontal plane, i.e. an rightward offset; the second horizontal offset represents an offset in the longitudinal palletizing direction in the horizontal plane, i.e. a rearward offset.

Figure 5A:
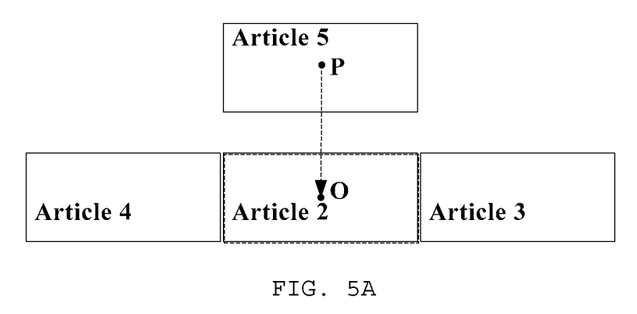
FIG. 5A to FIG. 5F show schematic diagrams of scenarios corresponding to different setting methods of a first horizontal offset and a second horizontal offset according to some embodiments of the present disclosure.

In a first setting method, the first horizontal offset and the second horizontal offset are both 0. At this time, the prestage position of the article to be palletized is located right above the placement position.

FIG. 5A shows a schematic rear view of an article palletizing scenario when the first horizontal offset and the second horizontal offset are both 0. As shown in FIG. 5A, the article 5 may be first moved to a position right above the placement position, and then the article to be palletized may be vertically dropped to complete palletizing. This setting method can ensure that the article to be palletized directly falls vertically, and the setting and the realization are both simple and convenient.

Figure 5B:
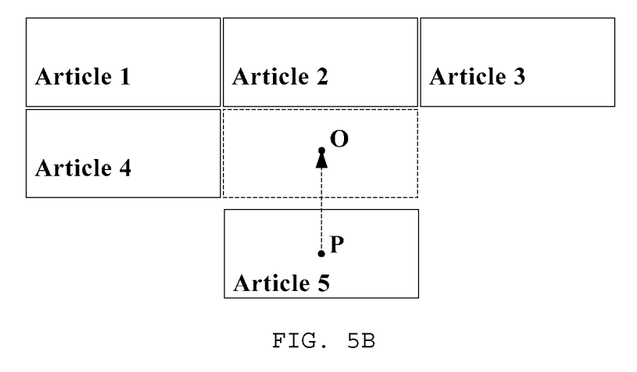
Figure 5C:
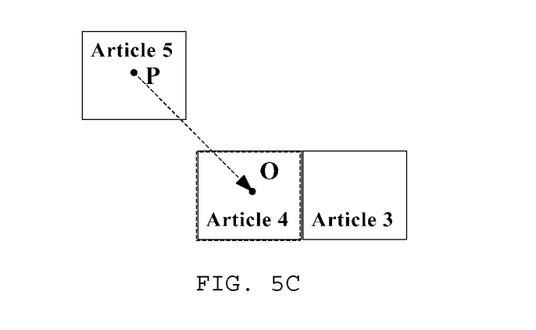

In a second setting method, one of the first horizontal offset and the second horizontal offset is 0, and the other is not 0. The following describes a case where the first horizontal offset is 0 and the second horizontal offset is not 0.

FIGS. 5B and 5C are schematic top and side views of an article palletizing scenario when the first horizontal offset is 0 and the second horizontal offset is not 0, respectively. In the top view as shown in FIG. 5B, article X is moving in a straight-ahead direction; in the side view shown in FIG. 5C, the article X moves diagonally downward and forward. The setting method can make the article perform a gentle turn after reaching the prestage position, make the movement trajectory more smooth and coherent, and reduce the operation pressure of the robot.

Figure 5D:
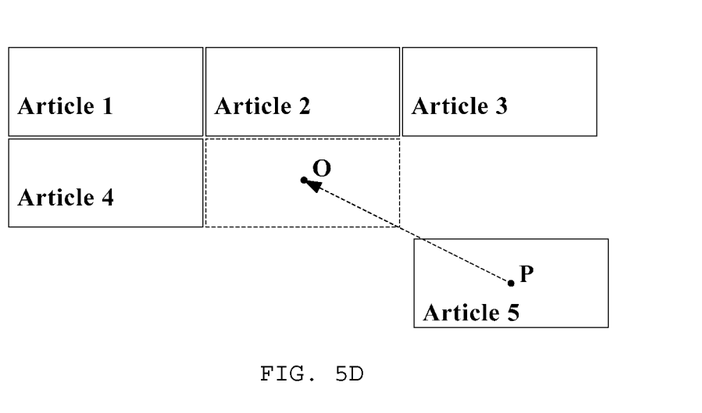

In a third setting method, neither the first horizontal offset nor the second horizontal offset is 0.

FIG. 5D is a schematic top view of an article palletizing scenario when neither the first horizontal offset nor the second horizontal offset is 0. In the top view as shown in FIG. 5D, the article X moves diagonally to the placement position. In some embodiments, the first horizontal offset may also be made equal to the second horizontal offset. Therefore, the distance between the article to be palletized and the articles in two palletizing directions on the horizontal plane can be equal during the movement.

In practical application scenarios, due to the accuracy of the equipment or an error in operation, the actual placement position of the article may slightly deviate from the preset placement position. The third setting method described above can still avoid collisions under the condition that errors exist in palletizing.

Figure 5E:
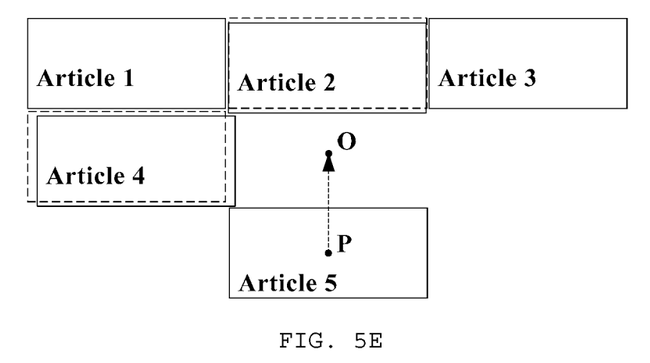
Figure 5F:
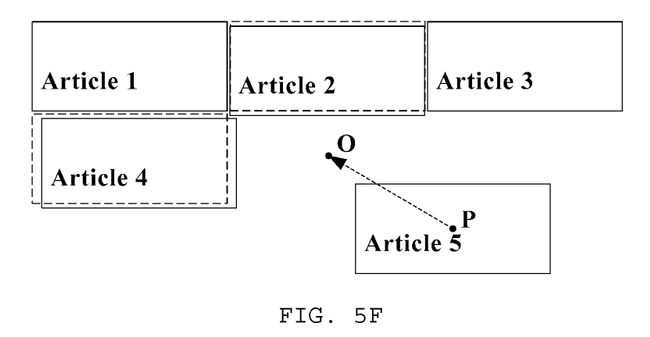

FIGS. 5E and 5F are schematic diagrams of different arrangements of the horizontal offset in the case of an error in the placement of the article. In FIGS. 5E and 5F, solid line frames marked with articles 1 to 4 are actual positions where the articles 1 to 4 are placed, and dashed line frames are used to indicate positions where the articles 2 and 4 should be placed; the article 5 to be palletized is represented by a solid line frame, wherein its placement position is a point O and the prestage position is a point P.

In FIG. 5E, the first horizontal offset is 0 and the second horizontal offset is not 0. That is, the article 5 moves forward in a plan view. When other articles are palletized without errors, the articles 5 can smoothly move to the placement position; when other articles are palletized with errors, the article 5 may collide with the article 4 when the article 5 moves forward after moving to the illustrated position.

In FIG. 5F, neither the first horizontal offset nor the second horizontal offset is 0. That is, the article 5 diagonally moves to the left and forward in a plan view. At this time, even if the articles 1 to 4 are palletized with errors, the article 5 does not collide with the edges and corners of the articles 1 to 4 during the moving process. Also, when article 5 reaches the vicinity of the placement position and comes into contact with articles 2 and 4, it may also push articles 2 and 4 and other adjacent articles into slight movement to bring the palletized articles closer to where they should be placed.

Therefore, by setting the first horizontal offset and the second horizontal offset to be not 0, not only can the movement trajectory be smoother and more consistent, but also the collision of objects can be prevented in a scene where errors exist in palletizing.

The horizontal offset and the vertical offset can also be set according to the size and placement of the articles. An offset setting method of some embodiments of the present disclosure is described below with reference to FIG. 6.

Figure 6:
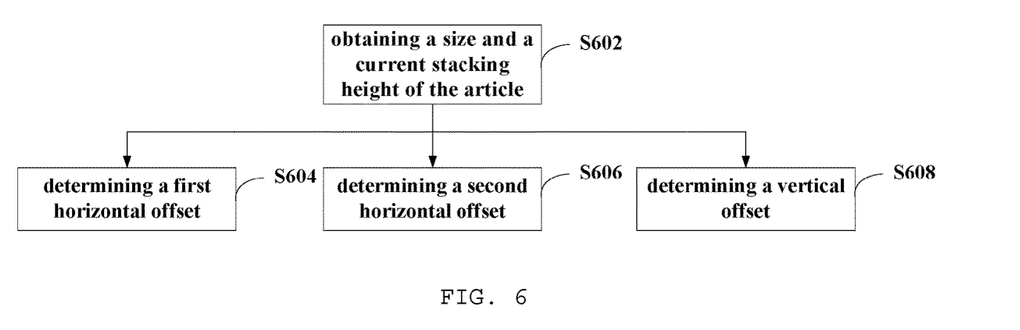
FIG. 6 shows a schematic flow diagram of an offset setting method according to some embodiments of the present disclosure.

FIG. 6 shows a schematic flow diagram of an offset setting method according to some embodiments of the present disclosure. As shown in FIG. 6, the offset setting method of this embodiment includes steps S602 to S606.

In step S602, a size of the article to be palletized and a current palletizing height are obtained, wherein the size includes a length of the article in the lateral palletizing direction and a length of the article in the longitudinal palletizing direction. That is, the length, width and height of the article are obtained.

In step S604, a product of a length of the article to be palletized in the lateral palletizing direction on the horizontal plane and a preset lateral ratio is determined as a first horizontal offset.

In step S606, a product of a length of the article to be palletized in the longitudinal palletizing direction on the horizontal plane and a preset longitudinal ratio is determined as a second horizontal offset.

In some embodiments, the preset lateral and longitudinal ratio may be 0.5 to 1, so that the article does not occupy too much extra space when moving to the prestage position, and maintains a certain safety distance from the placed article to avoid collision.

In step S608, a vertical offset is determined based on a height of the placement position from the pallet, wherein, the height means a vertical distance from the placement position to a horizontal plane where a pallet for palletizing the article to be palletized locates.

The vertical offset may be negatively related to the height of the placement position from the pallet. That is, the higher the article is stacked, the smaller a difference in height between the prestage position and the placement position. When the article is stacked low, the article to be palletized can be easily lifted high. When the articles are accumulated to a certain height, a difference in height between the prestage position and the placement position can be reduced, so that the time and burden of the robot in lifting operation are reduced.

Through the method of the embodiments, a horizontal offset can be automatically determined according to the size of the article, and a vertical offset can be automatically determined according to the stacking height of the article, which can not only improve the palletizing efficiency, but also save the occupied space during palletizing, and reduce the workload of the robot.

As needed, those skilled in the art may choose to perform some of the steps in the above embodiments, for example, only steps S602 and S604 are used to determine the first horizontal offset, only steps S602 and S606 are used to determine the second horizontal offset, only steps S602 and S608 are used to determine the vertical offset, and so on, which are not described herein again.

The present disclosure can also automatically calculate the placement position of each article to be palletized through the manners of shifting the coordinate. In some embodiments, a placement position of the first article to be palletized in a layer of a palletizing place may be determined first, and then an adjacent placement position is determined according to a determined placement position and a size of an article to be palletized placed on the determined placement position in a layer of a palletizing place in sequence until an edge of the article to be palletized placed on the adjacent placement position exceeds an edge of a pallet. A placement position coordinate determination method of some embodiments of the present disclosure is described below with reference to FIG. 7. The method of this embodiment is suitable for palletizing articles having the same size.

Figure 7:
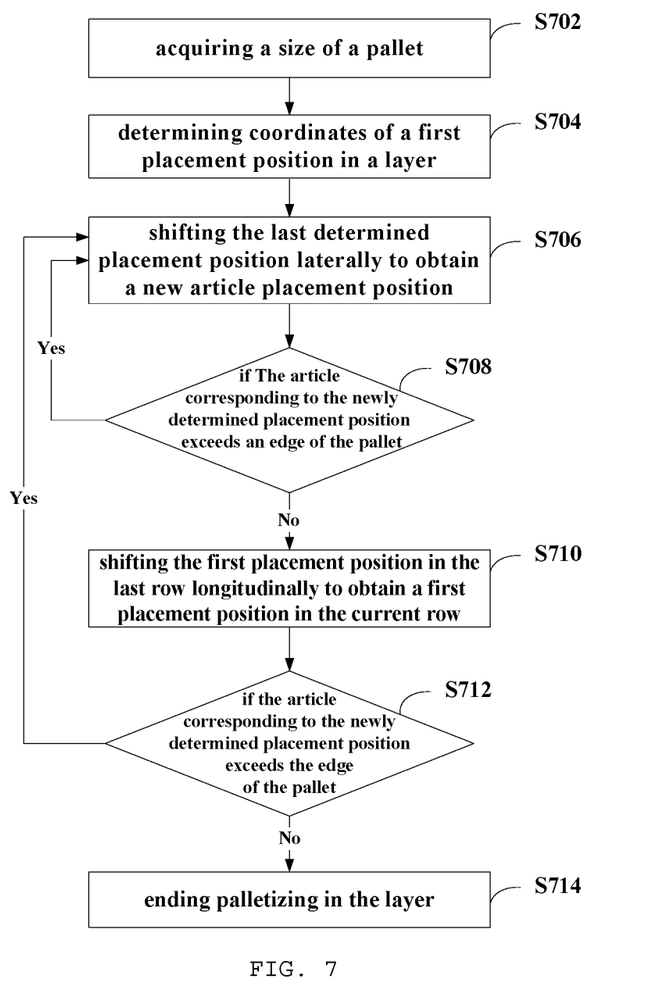
FIG. 7 shows a schematic flow diagram of a placement position coordinate determination method according to some embodiments of the present disclosure.

FIG. 7 shows a schematic flow diagram of a placement position coordinate determination method according to some embodiments of the present disclosure. As shown in FIG. 7, the placement position coordinate determination method of this embodiment includes steps S702 to S714.

In step S702, a size of the pallet is acquired, the size of the pallet including a length and a width of the pallet.

In step S704, the coordinates of the placement position of the first article to be palletized in a layer of the pallet are determined.

In step S706, the last determined article placement position is shifted in the lateral palletizing direction by the length of the article to obtain a new article placement position.

In step S708, if the newly determined article placement position is shifted in the lateral palletizing direction by 0.5 times the length of the article without exceeding the edge of the pallet, step S706 is repeatedly performed. That is, in the case where the edge of the article being palletized in the row does not exceed the edge of the pallet, the article can be palletized sequentially in the lateral palletizing direction.

In step S710, a placement position of the first article to be palletized in the previous row of articles is shifted towards the longitudinal palletizing direction, so as to determine a placement position of the first article to be palletized in the current row, where the offset length is a width of the article.

Then, for each row of articles, the shifting method described above may be used to determine a position of each article in the same row.

In step S712, if the newly determined article placement position is shifted in the lateral palletizing direction by 0.5 times the length of the article without exceeding an edge of the pallet, steps S706 to S708 are performed. That is, in the case where the edge of the article being palletized in the column does not exceed the edge of the pallet, the article can be palletized sequentially in the longitudinal palletizing direction.

In step S714, the palletizing of the layer is ended.

By the method of the embodiment, the coordinates of the placement position of each article in the pallet can be automatically determined, so that the palletizing efficiency is improved.

For the palletizing of articles with the same length and the same height, as well as for the palletizing of articles with the same width and the same height, reference can be made to the above-described embodiments, the only difference being the amount of offset when the shifting is performed. For example, for the palletizing of articles with the same width and the same height, when the lateral shifting of step S706 is performed, after the placement position of article A is determined, the offset amount is half the sum of the lengths of articles A and B when the placement position of article B laterally adjacent to the article A is determined. Thus, the present disclosure may also be applicable to palletizing articles with different specifications and sizes.

The palletizing control device of some embodiments of the present disclosure is described below with reference to FIG. 8A.

Figure 8A:
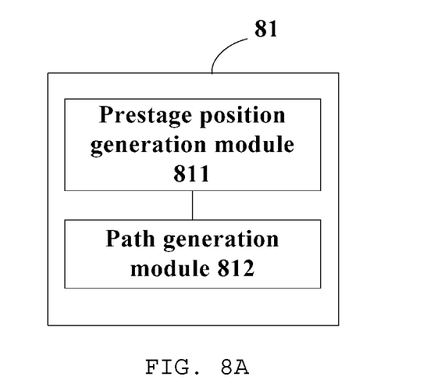
FIG. 8A and FIG. 8B show structural schematic diagrams of a palletizing control device according to some embodiments of the present disclosure.

FIG. 8A shows a structural schematic diagram of a palletizing control device according to some embodiments of the present disclosure. As shown in FIG. 8A, a palletizing control device 81 of this embodiment comprises a prestage position generation module 811 configured to generate a prestage position of an article to be palletized by respectively shifting a placement position of the article to be palletized along a horizontal palletizing direction by a horizontal offset corresponding to the article to be palletized and along a vertical palletizing direction by a vertical offset corresponding to the article to be palletized; and a path generation module 812 configured to generate movement path information representing a straight path from the prestage position of the article to be palletized to the placement position of the article to be palletized.

The horizontal offset may comprise a first horizontal offset representing an offset in a lateral palletizing direction in a horizontal plane and a second horizontal offset representing an offset in a longitudinal palletizing direction in the horizontal plane.

In some embodiments, the first horizontal offset is a product of a length of the article to be palletized in the lateral palletizing direction and a preset lateral ratio.

In some embodiments, the second horizontal offset is a product of a length of the article to be palletized in the longitudinal palletizing direction and a preset longitudinal ratio.

In some embodiments, the vertical offset is negatively related to a vertical distance from the placement position to a horizontal plane where a pallet for palletizing the article to be palletized locates.

In some embodiments, the path generation module 812 is further configured to generate movement path information for a plurality of articles to be palletized, comprising information on a movement path from a starting position to a prestage position of an article to be palletized or information on a movement path from a placement position of an article to be palletized to a starting position of another article to be palletized.

The palletizing control device of further embodiments of the present disclosure is described below with reference to FIG. 8B.

Figure 8B:
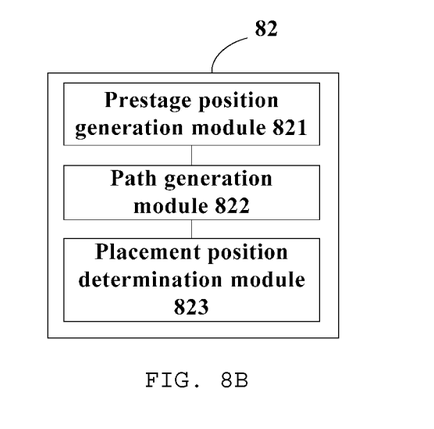

FIG. 8B shows a structural schematic diagram of a palletizing control device according to further embodiments of the present disclosure. As shown in FIG. 8B, a palletizing control device 82 of this embodiment includes a prestage position generation module 821 and a path generation module 822, and specific implementations of the prestage position generation module 821 and the path generation module 822 may refer to the prestage position generation module 811 and the path generation module 812 in the embodiment of FIG. 8A, which are not described herein again. In some embodiments, the palletizing control device 82 may further comprise a placement position determination module 823 configured to determine an adjacent placement position according to a determined placement position and a size of an article to be palletized placed on the determined placement position in a layer of a palletizing place in sequence until an edge of the article to be palletized placed on the adjacent placement position exceeds an edge of a pallet.

In addition, the palletizing control device provided by the embodiments of the present disclosure may further include an I/O monitoring module, a buffer area, and the like. The I/O control module is configured to detect the position of a cylinder of the end effector, collect air pressure sensor data, and the like for understanding a current state of the end effector. The buffer area is used for storing information such as a starting position, a placement position and a prestage position of each article to be palletized.

Figure 9:
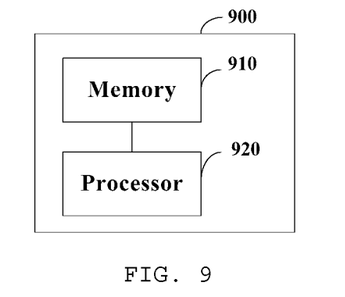
FIG. 9 shows a structural schematic diagram of a palletizing control device according to further embodiments of the present disclosure.

FIG. 9 shows a structural schematic diagram of a palletizing control device according to further embodiments of the present disclosure. As shown in FIG. 9, device 900 of this embodiment includes: a memory 910 and a processor 920 coupled to the memory 910, the processor 920 being configured to perform the palletizing control method of any of the embodiments described above based on instructions stored in the memory 910.

Memory 910 may include, for example, a system memory, a fixed non-volatile storage medium, and the like. The system memory stores, for example, an operating system, an application program, a Boot Loader, and other programs.

Figure 10:
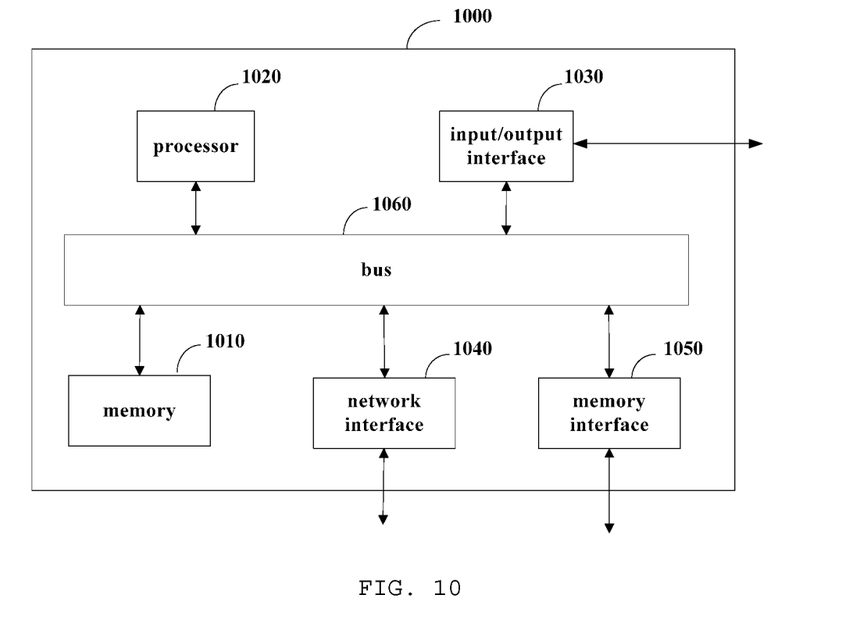
FIG. 10 shows a structural schematic diagram of a palletizing control device according to still further embodiments of the present disclosure.

FIG. 10 is a structural schematic diagram of a palletizing control device according to still further embodiments of the present disclosure. As shown in FIG. 10, device 1000 of this embodiment includes memory 1010 and processor 1020, and may also include input/output interface 1030, network interface 1040, storage interface 1050, and so forth. These interfaces 1030, 1040, 1050 and the memory 1010 and the processor 1020 may be connected by a bus 1060, for example. The input/output interface 1030 provides a connection interface for input/output devices such as a display, a mouse, a keyboard, and a touch screen. The network interface 1040 provides a connection interface for various networking devices. The storage interface 1050 provides a connection interface for an external storage device such as an SD card and a U disk.

The embodiments of the present disclosure also provide a computer-readable storage medium having stored thereon a computer program, wherein the program, when executed by a processor, implements any one of the foregoing palletizing control methods.

It shall be understood by those skilled in the art that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (including but not limited to disks, CD-ROM, optical storage, etc.) having computer-usable program code embodied in the medium.

The present disclosure is described with reference to the flow diagrams and/or block diagrams of the method, device (system) and computer program product according to the embodiments of the present disclosure. It shall be understood that each flow and/or block in the flow diagrams and/or block diagrams and a combination thereof may be implemented by computer program instructions. These computer program instructions may be provided to the processor of a general purpose computer, a dedicated computer, an embedded processing device or any other programmable data processing device to produce a machine causing the instructions executed by the processor of the computer or the other programmable data processing device to produce means for implementing the functions designated in the one or more flows in the flow charts and/or one or more blocks in the block diagrams.

These computer program instructions may be stored in a computer readable memory that can direct a computer or any other programmable data processing device to operate in a specific manner, such that the instructions stored in the computer readable memory produce a manufactured article including instruction means that implements the functions designated in one or more flows in the flow charts and/or one or more blocks in the block diagrams.

These computer program instructions may also be loaded on a computer or any other programmable data processing device causing the computer or the other programmable data processing device to perform a series of operation steps to produce a computer-implemented process, such that the instructions executed on the computer or the other programmable device provide steps for implementing the functions designated in the one or more flows in the flow charts and/or one or more blocks in the block diagrams.

The above contents are only preferred embodiments of the present disclosure, but are not used to limit the present disclosure. Any modification, equivalent replacement, improvement and etc. within spirit and principles of the present disclosure shall be contained in the protection scope of the present disclosure.

What is claimed is:

1. A palletizing control method, comprising:
generating a pre-stage position of an article to be palletized by respectively shifting a placement position of the article to be palletized along a horizontal palletizing direction by a horizontal offset corresponding to the article to be palletized and along a vertical palletizing direction by a vertical offset corresponding to the article to be palletized; and
generating movement path information representing a straight path from the pre-stage position of the article to be palletized to the placement position of the article to be palletized.

2. The control method of claim 1, wherein the control method comprises:
determining an adjacent placement position according to a determined placement position and a size of an article to be palletized placed on the determined placement position in a layer of a palletizing place in sequence until an edge of the article to be palletized placed on the adjacent placement position exceeds an edge of a pallet.

3. The control method of claim 1, wherein the horizontal offset comprises a first horizontal offset representing an offset in a lateral palletizing direction in a horizontal plane and a second horizontal offset representing an offset in a longitudinal palletizing direction in the horizontal plane.

4. The control method of claim 3, wherein,
the first horizontal offset is a product of a length of the article to be palletized in the lateral palletizing direction and a preset lateral ratio; or
the second horizontal offset is a product of a length of the article to be palletized in the longitudinal palletizing direction and a preset longitudinal ratio.

5. The control method of claim 1, wherein the vertical offset is negatively related to a vertical distance from the placement position to a horizontal plane where a pallet for palletizing the article to be palletized is located.

6. The control method of claim 1, wherein, the generating movement path information representing a straight path from the pre-stage position of the article to be palletized to the placement position of the article to be palletized comprises:
generating movement path information for a plurality of articles to be palletized, comprising information on a movement path from a starting position to a pre-stage position of an article to be palletized or information on a movement path from a placement position of an article to be palletized to a starting position of another article to be palletized.

7. A palletizing control device, comprising:
a memory; and
a processor coupled to the memory, the processor configured to execute a palletizing control method for performing instructions comprising:
generating a pre-stage position of an article to be palletized by respectively shifting a placement position of the article to be palletized along a horizontal palletizing direction by a horizontal offset corresponding to the article to be palletized and along a vertical palletizing direction by a vertical offset corresponding to the article to be palletized; and
generating movement path information representing a straight path from the pre-stage position of the article to be palletized to the placement position of the article to be palletized.

8. A palletizing control system, comprising:
the palletizing control device of claim 7; and
a robot controller configured to instruct a robot to palletize articles according to the movement path information generated by the palletizing control device.

9. The palletizing control device of claim 7, wherein the instructions comprise:
determining an adjacent placement position according to a determined placement position and a size of an article to be palletized placed on the determined placement position in a layer of a palletizing place in sequence until an edge of the article to be palletized placed on the adjacent placement position exceeds an edge of a pallet.

10. The palletizing control device of claim 7, wherein the horizontal offset comprises a first horizontal offset representing an offset in a lateral palletizing direction in a horizontal plane and a second horizontal offset representing an offset in a longitudinal palletizing direction in the horizontal plane.

11. The palletizing control device of claim 10, wherein,
the first horizontal offset is a product of a length of the article to be palletized in the lateral palletizing direction and a preset lateral ratio; or
the second horizontal offset is a product of a length of the article to be palletized in the longitudinal palletizing direction and a preset longitudinal ratio.

12. The palletizing control device of claim 7, wherein the vertical offset is negatively related to a vertical distance from the placement position to a horizontal plane where a pallet for palletizing the article to be palletized is located.

13. The palletizing control device of claim 7, wherein, the generating movement path information representing a straight path from the pre-stage position of the article to be palletized to the placement position of the article to be palletized comprises:
generating movement path information for a plurality of articles to be palletized, comprising information on a movement path from a starting position to a pre-stage position of an article to be palletized or information on a movement path from a placement position of an article to be palletized to a starting position of another article to be palletized.

14. A non-transitory computer readable storage medium having stored thereon a computer program which, when executed by a processor, implements the palletizing control method for performing instructions comprising:
generating a pre-stage position of an article to be palletized by respectively shifting a placement position of the article to be palletized along a horizontal palletizing direction by a horizontal offset corresponding to the article to be palletized and along a vertical palletizing direction by a vertical offset corresponding to the article to be palletized; and
generating movement path information representing a straight path from the pre-stage position of the article to be palletized to the placement position of the article to be palletized.

15. The non-transitory computer readable storage medium of claim 14, wherein the instructions comprise:
determining an adjacent placement position according to a determined placement position and a size of an article to be palletized placed on the determined placement position in a layer of a palletizing place in sequence until an edge of the article to be palletized placed on the adjacent placement position exceeds an edge of a pallet.

16. The non-transitory computer readable storage medium of claim 14, wherein the horizontal offset comprises a first horizontal offset representing an offset in a lateral palletizing direction in a horizontal plane and a second horizontal offset representing an offset in a longitudinal palletizing direction in the horizontal plane.

17. The non-transitory computer readable storage medium of claim 16, wherein,
   the first horizontal offset is a product of a length of the article to be palletized in the lateral palletizing direction and a preset lateral ratio; or
   the second horizontal offset is a product of a length of the article to be palletized in the longitudinal palletizing direction and a preset longitudinal ratio.

18. The non-transitory computer readable storage medium of claim 14, wherein the vertical offset is negatively related to a vertical distance from the placement position to a horizontal plane where a pallet for palletizing the article to be palletized is located.

19. The non-transitory computer readable storage medium of claim 14, wherein, the generating movement path information representing a straight path from the pre-stage position of the article to be palletized to the placement position of the article to be palletized comprises:
   generating movement path information for a plurality of articles to be palletized, comprising information on a movement path from a starting position to a pre-stage position of an article to be palletized or information on a movement path from a placement position of an article to be palletized to a starting position of another article to be palletized.

* * * * *